United States Patent [19]

Miller

[11] Patent Number: 4,524,854
[45] Date of Patent: Jun. 25, 1985

[54] ADJUSTABLE AIR GAP AND METHOD FOR ELECTROMAGNETIC CLUTCH

[75] Inventor: Donald L. Miller, Horseheads, N.Y.

[73] Assignee: Facet Enterprises, Inc., Tulsa, Okla.

[21] Appl. No.: 425,589

[22] Filed: Sep. 28, 1982

[51] Int. Cl.³ .............................................. F16D 27/10
[52] U.S. Cl. ................................ 192/84 C; 192/84 R; 192/110 R; 403/259; 403/316; 29/426.6; 29/434; 29/526 R; 29/256
[58] Field of Search ............... 192/84 C, 110 R, 84 B, 192/84 R; 403/259, 261, 316, 320; 29/526 R, 426.6, 434, 256; 411/195, 196

[56] References Cited

U.S. PATENT DOCUMENTS

| | | | |
|---|---|---|---|
| 197,762 | 12/1877 | Calhoun | 411/195 |
| 347,764 | 8/1886 | Baker | 411/195 |
| 768,954 | 8/1904 | Romberger | 411/196 X |
| 3,455,421 | 7/1969 | Miller . | |
| 3,703,227 | 11/1972 | Murakami et al. | 192/110 R X |
| 3,724,621 | 4/1973 | Heidorn | 192/84 C X |
| 3,762,516 | 10/1973 | Matsushita | 192/84 C |
| 4,150,738 | 4/1979 | Sayo et al. | 192/110 R X |
| 4,241,818 | 12/1980 | Miller | 192/84 C X |
| 4,285,420 | 8/1981 | Sekalla | 192/110 R X |
| 4,354,711 | 10/1982 | Main | 29/526 R X |
| 4,432,446 | 2/1984 | Okano et al. | 192/84 C |

FOREIGN PATENT DOCUMENTS

| | | | |
|---|---|---|---|
| 1127828 | 4/1962 | Fed. Rep. of Germany | 29/256 |
| 0405870 | 1/1910 | France | 411/195 |

Primary Examiner—Rodney H. Bonck
Assistant Examiner—David D. House
Attorney, Agent, or Firm—Remy J. VanOphem

[57] ABSTRACT

A method and apparatus for making an axially adjustable connection between a clutch shaft and an armature assembly to enable axial adjusting movement of the armature plate relative the inner body magnetic pole face to precisely set the air gap spacing through which an electromagnetic coil attracts the armature plate into frictional driving engagement with the inner body pole face. The hub of the armature assembly is placed upon the clutch shaft and a feeler gage is positioned between the pole face and the armature plate to establish the desired air gap spacing. An adjusting nut is threadedly advanced along a thread of the clutch shaft for progressive axial advance in the direction toward the inner body and engages the hub to maintain the armature assembly against air gap increasing movement away from the pole face. A retaining cap fits over the adjusting nut and engages with an offset abutment face on the shaft to retain the adjusting nut against further adjusting rotation in either direction relative the shaft. A plug member is threaded into a recess of the hub and engages with the end of the shaft to maintain the armature assembly against air gap decreasing movement toward the pole face subsequent to removal of the feeler gage. In the event of later disassembly of the electromagnetic clutch for maintenance or repair, the plug member, retaining cap and adjusting nut are removed. The plug member is then threadedly advanced into engagement with the end of the shaft and functions as a wheel puller facilitating disassembly of the armature assembly from the clutch shaft.

8 Claims, 3 Drawing Figures

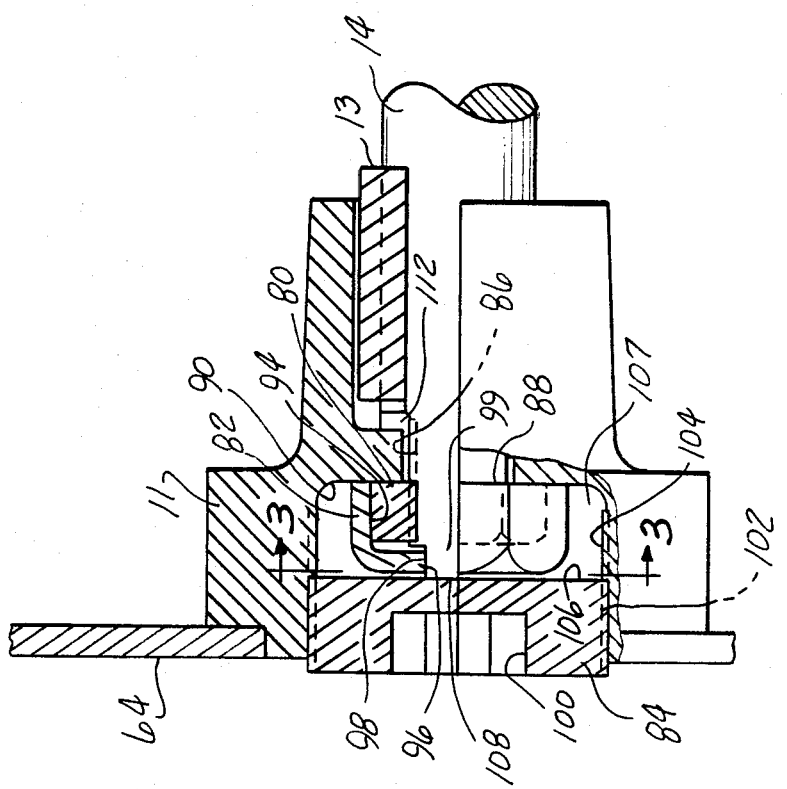
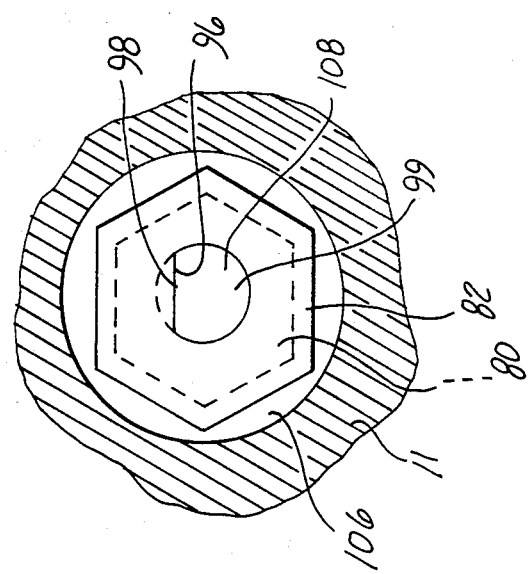

ADJUSTABLE AIR GAP AND METHOD FOR ELECTROMAGNETIC CLUTCH

BACKGROUND OF THE INVENTION

The invention relates to an air gap adjustment for an electromagnetic clutch and, more particularly, provides an adjustable connection between a clutch shaft and an armature assembly enabling precise axial adjustment of the armature assembly to obtain a precise air gap between the armature plate and the magnetic pole face of the clutch inner body.

SUMMARY OF THE INVENTION

It is well known to provide an electromagnetic clutch of the type having an axially movable plate which is drawn into engagement with a pole face of a shaft mounted inner body by the energization of an electromagnetic coil. The armature plate is mounted upon an armature hub by a spring which normally establishes the armature plate at a position spaced axially from the pole face to establish an air gap therebetween. The spring is yieldable upon energization of the electromagnetic coil to permit movement of the armature plate into frictional driving engagement with the inner body pole face so that a driving connection is established between the armature assembly and the clutch output member or shaft.

During assembly of the aforedescribed conventional electromagnetic clutch, it is necessary to precisely set the air gap so that the intensity of electromagnetic flux path between the pole face and the armature plate is sufficient to assure establishment of the frictional driving connection therebetween upon energization of the electromagnetic coil.

One way of obtaining a precise air gap between the inner body pole face and the armature plate is to manufacture and assemble each component of the clutch with such precision that the tolerance stack-up between the assembled parts will always provide an air gap which is within the design specification necessary to assure the necessary flux intensity. However, such precision may be very costly to obtain using conventional methods of mass production and assembly.

The prior art has recognized that the armature assembly may be adjustably positioned upon the end of the clutch shaft through the interposition of adjusting shims which are placed upon the end of the shaft before the mounting of the armature assembly hub on the shaft and the threading of an attaching nut on the shaft end.

A disadvantage of the use of shims for obtaining air gap adjustment is that the size or number of shims required must be determined through extensive gaging and measuring of the parts or through a trial and error technique of assembly, measurement of the air gap, and disassembly to add or remove shim stock.

Accordingly, it would be desirable to provide a connection between the armature assembly and the clutch shaft which would enable precise adjustment of the air gap.

SUMMARY OF THE INVENTION

The present invention provides a method and apparatus for making an axially adjustable connection between a clutch shaft and an armature assembly to enable axial adjusting movement of the armature plate relative to the inner body magnetic pole face to precisely set the air gap through which an electromagnetic coil attracts the armature plate into frictional driving engagement with the inner body pole face. The hub of the armature assembly is placed upon the clutch shaft and a feeler gage is positioned between the inner body pole face and the armature plate to hold the armature assembly against axial movement closer to the pole face than the desired air gap spacing therefrom. An adjusting nut is threadedly advanced along a thread of the clutch shaft for progressive axial advancement in the direction toward the inner body and functions to maintain the armature assembly against axial movement away from the pole face. A retaining cap is adapted to fit over the adjusting nut and engages with an offset abutment face on the shaft to retain the adjusting nut against further adjusting rotation in either direction relative to the shaft. A plug member is threadedly engaged within a threaded bore of the armature assembly hub and has an abutment face engageable with the end of the shaft upon progressive rotation and axial movement of the plug member. The plug member functions to maintain the armature assembly against movement toward the pole face subsequent to removal of the feeler gage. In the event of later disassembly of the electromagnetic clutch for maintenance or repair, the retaining cap and the adjusting nut are removed subsequent to removal of the plug member. The plug member is then threadedly advanced into engagement with the end of the shaft and functions as a wheel puller facilitating disassembly of the armature assembly from the clutch shaft.

One object, feature, and advantage of the invention resides in the provision of an adjusting nut threadedly advanced along the threaded clutch shaft to engage and maintain the armature assembly against axial movement away from an inner body pole face and a plug member threadedly advanced along the armature assembly and into abutment with the end of the clutch shaft to retain the armature assembly against axial movement toward the pole face.

Another object, feature, and advantage of the invention resides in the provision of a method of precise setting of the air gap between an armature assembly and an inner body pole face and includes the steps of placing a feeler gage between the armature plate and the pole face, progressively threading an adjusting nut onto the end of the clutch shaft and into engagement with the armature assembly to maintain the armature assembly against axial movement away from the pole face, progressively threading a plug member within a threaded bore of the armature assembly and into engagement with the end of the shaft to retain the armature assembly against axial movement toward the pole face, and removing the feeler gage.

A still further feature, object and advantage of the invention resides in the provision of a plug member threadedly engageable with the armature assembly for progressive movement into engagement with the end of the clutch shaft to retain the armature assembly at a desired air gap spacing away from an inner body pole face and being enabled of further progressive threaded movement upon disassembly of the clutch to forceably move the armature assembly away from the pole face against any interference fit between the armature assembly and the clutch shaft.

These and other objects, features, and advantages of the invention will become apparent upon consideration of the specification in conjunction with the accompanying drawings.

BRIEF DESCRIPTION OF THE DRAWINGS

FIG. 2 is an enlarged fragmentary view of FIG. 1 showing the adjustable connection between the armature assembly and the clutch shaft; and FIG. 3 is a partial sectional view taken in the direction of arrows 3—3 of FIG. 2.

DETAILED DESCRIPTION OF THE PREFERRED EMBODIMENT

Figure 1:
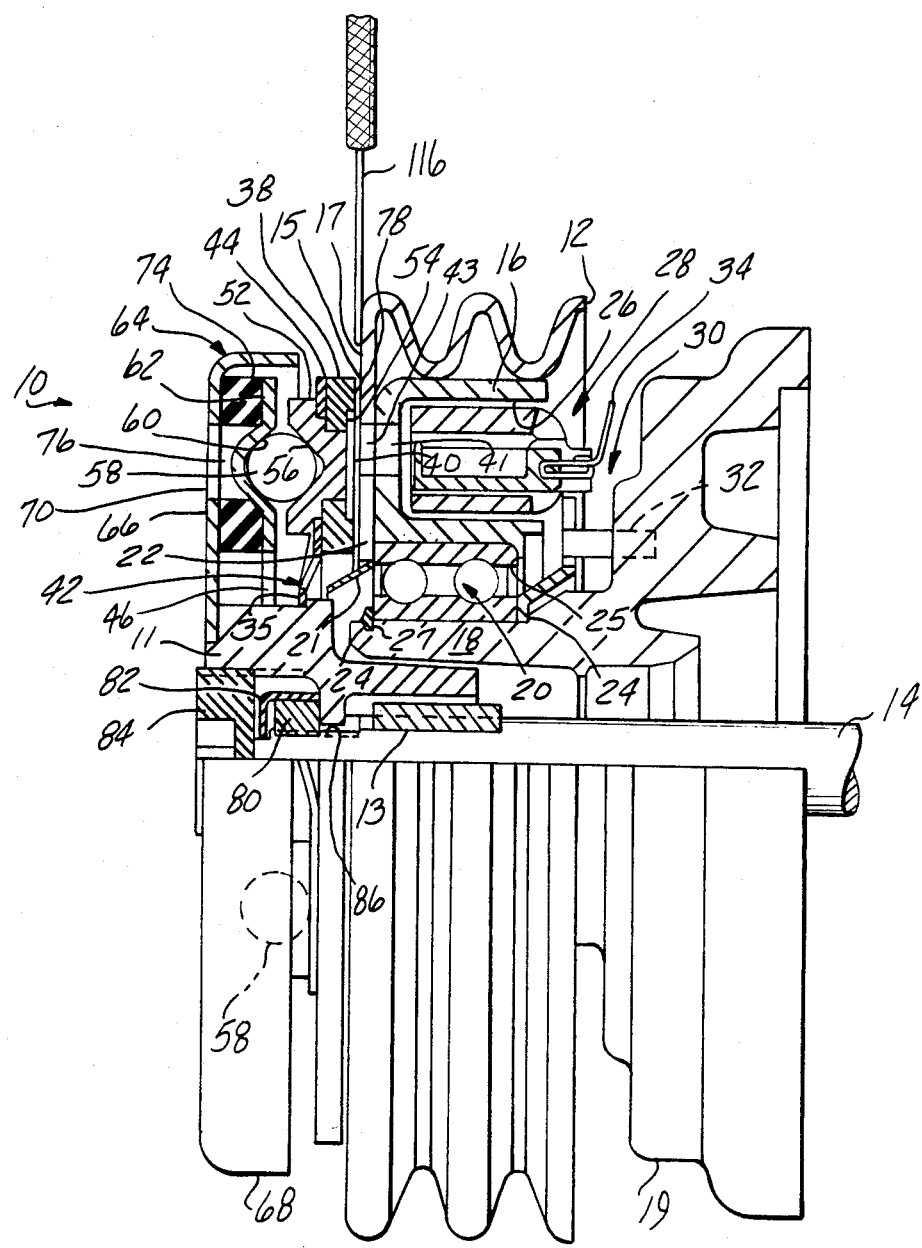
FIG. 1 is a partial sectional view of an electromagnetic clutch according to the invention.

In the following detailed description, certain specific terminology will be employed for the sake of clarity and a particular embodiment described in accordance with the requirements of 35 U.S.C. 112. It is to be understood that the same is not intended to be limiting and, indeed, should not be so construed inasmuch as the invention is capable of taking many forms and variations within the scope of the appended claims.

Referring to the drawings, an electromagnetic clutch 10, according to the present invention, is configured to receive an input drive from a drive pulley 12, and to controllably establish rotary drive to a shaft 14 through a hub 11 which is connected to the shaft 14 by a key 13 as will be discussed in detail hereinafter.

The particular clutch application shown relates to an automotive air conditioning compressor drive, with the compressor input being via the shaft 14, and the belt drive pulley 12 being driven by the engine crankshaft.

As will be appreciated by those skilled in the art, the drive could be reversed through the clutch unit and the designation of one or the other of the external driving components as driving or driven elements is dependent only on the particular external driving connections established for the particular application.

The drive pulley 12 has a radially inward wall 17 which is welded to a ferromagnetic inner body 16 so that the radially inward wall 17 of the drive pulley 12 is integral with the inner body 16 and forms a magnetic inner body pole face 15. The inner body 16 is mounted on an extension 18 of a stationary compressor housing 19 by means of an anti-friction bearing assembly 20. The inner body 16 is axially located by means of a terminal portion 22 of the radially inward wall 17 of the drive pulley 12 abutting an axial face of the anti-friction bearing assembly 20 and is secured by staking at 25. A suitable snap retainer 24 and shoulder 27, in turn, axially locates the anit-friction bearing assembly 20 on the housing extension 18. A bearing shield 21 is also provided to prevent the entrance of dirt, water, etc. into the bearing 20. Further, the bearing shield 21 prevents the bearing lubricant from leaking onto the friction surfaces of the clutch.

The inner body 16 is provided with an annular cavity 26 within which is disposed an electromagnetic coil assembly 28. The coil assembly 28 is mounted to be relatively stationary by means of a retainer arrangement 30 axially located on the housing extension 18 and pinned at 32 to the compressor housing 19 to position the electromagnetic coil assembly 28 radially and to maintain it stationary with respect to the rest of the assembly. This coil retaining arrangement is disclosed in detail in U.S. Pat. No. 3,455,421. Terminals 34 are provided to make connections with the control circuit for energizing the electromagnetic coil assembly 28.

A ferromagnetic annular armature plate 38 of an armature assembly 40 registers with the inner body pole face 15 and is mounted to be relatively axially movable, so as to be moved axially into and out of frictional engagement with the inner body pole face 15 to establish a driving connection through the clutch unit 10. The axial movement of the armature plate 38 is induced by energization of the electromagnetic coil assembly 28 to create a magnetic flux field passing through the inner body 16 and causing a magnetic attraction between the armature plate 38 and the inner body pole face 15. The radially inward wall 17 of the drive pulley 12 is provided with circumferential slots such as 43, and the inner body 16 is provided with circumferential slots 41 which are aligned with the slots 43, to insure the passage of magnetic flux into the armature plate 38 in a toroidal path.

The armature plate 38 is mounted upon the hub 11 of the armature assembly 40 by means of a spider spring 42 having a central portion 46 suitably attached to the hub 11, with a vertical extension 35 of the central portion 46 abutting against a vertical shoulder portion of the hub 11, and a plurality of arms 44 emanating therefrom. Each arm 44 abuts against the armature plate 38 and is retained thereto by ball pocket inserts 52 which extend through apertures in the arms 44 and in the armature plate 38 and are staked or otherwise suitably secured to the armature plate 38. The ball pocket inserts 52 enable the armature plate 38 to be relatively thin since the conical pockets 56 are not machined directly into the armature plate 38. As shown, the armature plate 38 has an inwardly offset surface 54 which is disposed radially inwardly of the portion of armature plate which engages the inner body pole face 15. Also, the ball pocket inserts 52 may be manufactured from a relatively hard material while maintaining a softer material for the armature plate 38 which is also preferable for magnetic purposes. The spider spring 42 is deflected by assembly, as shown in FIG. 1, to create a preload return force. Disposed in each pocket 56 is a spherical ball 58, each of which is also disposed in an oppositely located conical pocket 60 formed in a ball plate 62 of the armature assembly 40.

The ball plate 62 is an annular element having the conical pockets 60 formed as dimples, and the precise conical form then machined therein. The ball plate 62 is disposed within a cup-shaped coupling plate 64 having a radially extending wall 66 and a terminal stiffening flange 68 which is reversely oriented to generally enclose the ball plate 62. The coupling plate 64 is staked or otherwise suitably secured to the armature assembly hub 11 for rotation therewith.

Intermediate the coupling plate 64 and the ball plate 62 is a space which is occupied by a ring 74 of a suitable elastomeric material having suitable shock absorbing characteristics. The ring 74 is bonded to both the coupling plate 64 and the ball plate 62 to be capable of yieldably transmitting torque therebetween. Thus, relative angular movement may take place between the ball plate 62 and the coupling plate 64. At the same time, the compression of the ring 74 between the ball plate 62 and coupling plate 64 allows relative axial movement such as to enable a torque boosting action to take place more gradually to provide a dual action shock absorption. The ring 74 is also provided with openings 76 opposite the pockets 60 to accommodate this relative axial movement. The ring 74 may be constructed of any suitable material for the particular application. One such satisfactory material being Uniroyal compound number 1105, Durometer A 40–50. Reference may be had to U.S. Pat. No. 4,241,818 for additional description of the aforedescribed shock absorbing mechanism.

Referring to FIG. 1, it will be understood that the intensity of the magnetic flux passing between the inner body pole face 15 and the armature plate 38 is dependent upon the size of the air gap spacing, designated 78, between the inner body pole face 15 and the armature plate 38. In order to maintain the necessary and appropriate flux intensity, it is necessary to assemble the mass produced clutch parts in a manner which assures that the tolerance stack-up between the assembled parts will provide an air gap 78 within the design specification necessary to assure the needed flux intensity.

With reference to FIGS. 2 and 3, according to the present invention, the hub 11 of the armature assembly 40 is retained upon the shaft 14 by an adjusting nut 80, a retaining cap 82, and a plug 84. The adjusting nut 80 is threadedly advanced upon a thread 86 of the shaft 14 and has a face 88 which abuts with a flange face 90 of the hub 11 so that the adjusting nut 80 retains the hub 11 against leftward axial movement as viewed in FIG. 1 which would result in increasing the air gap spacing 78 between the armature plate 38 and the inner body pole face 15.

The retaining cap 82 is a sheet metal stamping which has a hexagonal inner cavity 94 adapted to fit closely upon the hexagonal adjusting nut 80. The retaining cap 82 has a D-shaped aperture defining a wall 96 which abuts with a radially facing offset abutment face 98 provided by machining a flat onto an end extension 99 of the shaft 14. The retaining cap 82 functions to lock the nut 80 against rotation relative the shaft 14.

The plug 84 has a hexagonal recess 100 for admitting a tool (not shown) by which the plug 84 is rotatably advanced within the hub 11 by mating threads 102 provided on the plug 84 and threads 104 provided in the wall defining a bore or recess 107 in the hub 11 The plug 84 is rotatably advanced axially to carry its inner face 106 into engagement with an end face 108 of the end extension 99. Accordingly, the plug 84 acts between the hub 11 and the shaft 14 and functions to retain the hub 11 against axial movement rightwardly, as viewed in FIG. 1, which would reduce the air gap spacing 78 between the armature plate 38 and the inner body pole face 15.

Operation

The existence of a clearance space designated 112 between the hub 11, and the key 13, and the shaft 14 provides a considerable range of permissible axial adjustment of the hub 11 relative the shaft 14 to obtain the specified air gap spacing 78. The assembly of the aforedescribed adjustable connection between the armature assembly hub 11 and the shaft 14 is initiated by positioning the hub 11 onto the shaft 14 and interposing a feeler gage 116 between the armature plate 38 and the inner body pole face 15. The thickness of the feeler gage 116 sets the desired precise air gap spacing 78. The adjusting nut 80 is then advanced along the shaft thread 86 so that the face 88 of the adjusting nut 80 engages the flange face 90 of the hub 11 and retains the hub 11 against leftward axial movement in the direction which would increase the air gap spacing 78. The retaining cap 82 is then installed over the adjusting nut 80 with the wall 96 abutting with the offset abutment face 98 of the shaft 14 so that the retaining cap 82 functions to lock the adjusting nut 80 against rotation relative the shaft 14. The plug 84 is then threadedly advanced into the recess 107 of the hub 11 and its inner face 106 engaged with the end face 108 of the shaft 14 so that the plug 84 retains the hub 11 against rightward axial movement in the air gap decreasing direction. The feeler gage 116 is then removed from interposition between the armature plate 38 and the inner body pole face 15.

If it is desired to disassemble the armature assembly 40 from the clutch for maintenance or service, the plug 84, retaining cap 82, and nut are sequentially removed from their respective positions shown in FIG. 1. Then the plug 84 is reinstalled and advanced along the thread 104 of the hub recess 107 and into engagement with the end face 108 of the shaft 14. A further forced rotation and advancement of the plug 84 onto the hub 11 causes the plug 84 to function as a wheel puller by which the hub 11 is forceably moved leftwardly relative the shaft 14 and any interference fit between hub 11, key 13, and shaft 14 is forceably broken to facilitate disassembly of the armature assembly 40 from the clutch.

Accordingly, the above recited objects of the present invention have been achieved by this arrangement, and a new and improved method and apparatus for adjustably mounting an armature assembly upon a clutch shaft provided. As will be appreciated by those skilled in the art, this particular design will be employed as either a clutch or as a brake; i.e., to provide a controllable rotary connection to a stationary structure or to a relatively rotatable member. For purposes of the present invention, the term clutch has been employed for the sake of clarity. It is to be understood that this term is intended to cover both clutch and brake units. Similarly, the input or drive can be reversed such that these terms are dependent on the external drive connections inasmuch as torque may be transmitted in either direction.

Furthermore, while the invention has been disclosed herein in terms of the specific preferred embodiments shown in the drawings, it is not intended to be limited thereto, but rather may be modified within the extent set forth in the appended claims. For example, the retaining cap 82 provides a preferred device for retaining and locking the adjusting nut 80 against rotation relative the shaft 14. However, other structures such as lock washers or adhesives may be employed.

What is claimed is:
1. An electromagnetic clutch apparatus for torque transmission between an input member and an output member, said electromagnetic clutch comprising:
    a first clutch member;
    a second clutch member spaced a predetermined distance from said first clutch member defining an air gap spacing therebetween, an armature mounted to one of said clutch members, said armature being axially moveable across said air gap spacing into frictional torque transmitting engagement with the other of said clutch members;
    a shaft mounting said one of said clutch members, said shaft further having means drivably interconnecting said one of said clutch members to effect unitary rotation therewith and enable axial adjusting movement of the one of said clutch members on said shaft to obtain a predetermined air gap spacing between said one of said clutch members and the other of said clutch members;
    a first helical thread on said shaft;
    a second helical thread on said one of said clutch members;

a first nut member threadedly engaged on said first helical thread of said shaft, said first nut member directly engaging said one of said clutch members to adjust said one of said clutch members to an axial position on said shaft establishing said predetermined air gap spacing between said other of said clutch members and said armature of said one of said clutch members; and a second nut member threadedly engaged on said second thread of said one of said clutch members, said second nut member further being in abutting engagement with said shaft so that said first and second nut members cooperate to act upon said shaft to effectively mount said one of said clutch members against axial movement in a dlrection away from said axial position on said shaft establishing said predetermined air gap spacing between said other of said clutch members and said armature of said one of said clutch member.

2. An electromagnetic clutch for establishing drive between first and second clutch members, comprising:

a ferromagnetic inner body having a radial face drivingly connected to said first clutch member;

a ferromagnetic armature drivingly connected to said second clutch member and having a radial face opposing said inner body radial face;

means mounting said armature and said inner body with said opposing radial faces spaced from one another by a predetermined air gap spacing therebetween, said mounting means having associated biasing means to enable relative axial movement to bring said radial faces into and out of driving engagement;

electromagnetic coil means mounted adjacent said inner body to cause said inner body and said armature to be drawn into driving engagement across said predetermined air gap spacing upon energization;

a shaft member mounting one of said clutch members concentrically with the other clutch member and having a threaded end portion;

a first threaded retainer threadedly advanced onto said threaded end portion of said shaft, said first threaded retainer directly engaging said one clutch member to position said one clutch member axially upon said shaft member to an axial position establishing said predetermined air gap spacing between said said radial faces of said armature and said inner body to retain said one clutch member against axial movement in one direction away from said predetermined air gap spacing;

said one clutch member having a threaded portion surrounding said shaft member; and a second threaded retainer threadedly advanced onto said threaded portion of said one clutch member, said second threaded retainer further being into abutting engagement with said shaft member to retain said one clutch member against axial movement in the other direction away from said predetermined air gap spacing between said radial faces of said armature and said inner body.

3. An electromagnetic clutch for torque transmission between a first clutch member and a second clutch member, comprising:

a shaft member having an externally threaded end portion and an end face;

a ferromagnetic inner body carried by said first clutch member, said first clutch member having a radial face concentric with said shaft member;

an armature assembly having a hub journalled upon said shaft member, said armature assembly having a threaded bore surrounding said threaded end portion of said shaft member;

an armature plate concentrically juxtaposed with said radial face of said inner body, said armature plate further comprising associated spring means enabling relative axial movement of said armature plate into and out of driving engagement with said inner body radial face;

drive means connecting said hub of said armature assembly with said shaft member for unitary rotation therewith to enable axial adjusting movement of said hub relative said shaft member to establish a predetermined air gap spacing between said inner body radial face and said armature plate;

an adjusting nut threadedly engaged onto said threaded end portion of said shaft member and advanced into direct abutting engagement with said hub to establish an adjusted axial position of said hub upon said shaft member at which said predetermined air gap spacing is obtained between said inner body radial face and said armature plate;

a plug member threadedly engaged into said threaded bore of said hub and advanced into abutting engagement with said end face of said shaft member to block said hub against axial movement upon said shaft member in the direction which would establish said armature plate closer to said inner body radial face than said predetermined air gap spacing therebetween; and electromagnetic coil means effective to draw said armature plate across said predetermined air gap spacing and into driving engagement with said inner body radial face whereby a drive connection is established between said first and second clutch members.

4. An electromagnetic clutch or torque transmission between a first clutch member and a second clutch member, comprising:

a mounting shaft having an externally threaded end portion, an end face, and an offset abutment;

a ferromagnetic inner body carried by said first clutch member further comprising a radial face concentric with said mounting shaft;

an armature assembly having a hub journalled upon said mounting shaft, said hub comprising a threaded bore surrounding said threaded end portion of said mounting shaft;

an armature plate concentrically juxtaposed with said radial face of said ferromagnetic inner body comprising associated spring means to enable axial movement of said armature plate relative said hub out of driving engagement with said ferromagnetic inner body radial face;

drive means connecting said hub with said mounting shaft for unitary rotation therewith and enabling axial adjusting movement of said hub relative said mounting shaft to establish a predetermined air gap spacing between said ferromagnetic inner body radial face and said armature plate;

an electromagnetic coil means effective to magnetically move said armature plate across said predetermined air gap spacing between said ferromagnetic inner body radial face and said armature plate into driving engagement with said ferromagnetic inner body radial face such that a drive connection between said first and second clutch members is established;

an adjusting nut threadedly engaged onto said threaded end portion of said mounting shaft and advanced into direct abutting engagement to limit air gap increasing movement of said armature plate away from said ferromagnetic inner body radial face;

a retainer cap engaged over said adjusting nut and engaged with the offset abutment of said mounting shaft to retain said adjusting nut against further adjusting rotation relative said mounting shaft; and a plug member threadedly engaged into said threaded bore of said hub and advanced into abutting engagement with said end face of said mounting shaft to block said hub against axial movement upon said mounting shaft in a direction such as to decrease said air gap.

5. In an electromagnetic clutch, a connection enabling axial adjustment between a threaded clutch shaft and a threaded armature assembly carried by said threaded clutch shaft for rotation therewith to set an air gap spacing between an armature plate and an inner body pole face, comprising:

an adjusting nut threadably advanceable on said threaded clutch shaft and directly abutting with said threaded armature assembly to prevent an increase in said air gap spacing by retaining said threaded armature assembly against axial movement away from said inner body pole face; and a plug member threadably advanceable relative said threaded armature assembly and having an abutment face engageable with said threaded clutch shaft to prevent a decrease in said air gap spacing by retaining said threaded armature assembly against axial movement toward said inner body pole face.

6. In an electromagnetic clutch, an axially adjustable connection between a threaded clutch shaft and an armature assembly keyed to said threaded clutch shaft for rotation therewith to enable precise setting of an air gap spacing between an armature plate of said threaded armature assembly and an inner body pole face further comprising;

an offset abutment face on said threaded clutch shaft;

an adjusting nut having a face adapted to directly abut with said armature assembly and threadedly engageable with said threaded clutch shaft for progressive axial movement in a direction toward said inner body pole face to establish said armature plate at a predetermined air gap spacing relative said inner body pole face and to maintain said armature assembly against air gap increasing movement axially away from said inner body pole face;

a retaining cap adapted to fit over said adjusting nut and nonrotatably engaging said offset abutment face of said threaded clutch shaft to retain said adjusting nut against further adjusting rotation relative said threaded clutch shaft; and a plug member threadedly engageable with said armature assembly and having an abutment face engageable with said threaded clutch shaft to retain said armature assembly against air gap decreasing movement toward said inner body pole face.

7. A method for precisely setting the air gap spacing between an inner body pole face and an armature plate carried by an armature assembly keyed upon a threaded clutch shaft for rotation therewith and axial adjusting movement relative thereto, said method comprising the steps of:

placing a feeler gage between said armature plate carried by said armature assembly and said inner body pole face to establish a predetermined air gap spacing to enable positioning of said armature assembly at the corresponding proper axial position upon said threaded clutch shaft;

progressively threading an adjusting nut onto the clutch shaft and into direct abutting engagement with said armature assembly to maintain said armature assembly against air gap increasing axial movement away from said inner body pole face;

progressively threading a plug member into a threaded bore of said armature assembly and into abutting engagement with the end of said threaded clutch shaft to retain said armature assembly against air gap decreasing axial movement toward said inner body pole face; and removing said feeler gage from between said armature plate and said inner body pole face.

8. A method for disassembly of an electromagnetic clutch having an armature assembly held at a precise air gap spacing away from an inner body pole face by an adjusting nut engaged upon a clutch shaft and abutting said armature assembly to prevent axial movement of said armature assembly away from said inner body pole face and a plug member threadedly engaged within a bore of said armature assembly and directly abutting with an end of said clutch shaft to maintain said armature assembly against axial movement toward said inner body pole face, comprising the steps of:

rotating said plug member to effect its axial movement away from engagement with said end of said clutch shaft and removal from said armature assembly;

rotating said adjusting nut relative said clutch shaft to effect its removal from said clutch shaft; and reinstalling and progressively rotating said plug member into a hub member for forced axial engagement with said end of said clutch shaft to function as a wheel puller and forceably break any interference fit between said armature assembly and said clutch shaft whereby said armature assembly may be removed from said clutch shaft.

* * * * *

UNITED STATES PATENT AND TRADEMARK OFFICE
CERTIFICATE OF CORRECTION

PATENT NO. : 4,524,854
DATED : June 25, 1985
INVENTOR(S) : Donald Leroy Miller

It is certified that error appears in the above-identified patent and that said Letters Patent is hereby corrected as shown below:

Column 1, line 16, after "movable" insert ---- armature ----.

Column 3, line 66, delete "coil" and insert ---- coil ----.

Column 5, line 37, after "11" insert a period ---- . ----.

Column 5, line 49, after "11," delete "and".

Column 9, line 40, delete "axially" and insert ---- axially ----.

Signed and Sealed this

Twenty-sixth Day of November 1985

[SEAL]

Attest:

DONALD J. QUIGG

Attesting Officer

Commissioner of Patents and Trademarks